United States Patent [19]

Parks

[11] Patent Number: 5,275,024
[45] Date of Patent: Jan. 4, 1994

[54] PAPER PULP WASHING

[75] Inventor: Clinton R. Parks, Hamilton, Ohio

[73] Assignee: The Black Clawson Company, Middletown, Ohio

[21] Appl. No.: 877,716

[22] Filed: May 4, 1992

[51] Int. Cl.$^5$ .......................... D21C 9/02; D06F 31/00
[52] U.S. Cl. .................................. 68/9; 162/60; 210/772; 210/401; 210/407; 68/158
[58] Field of Search ............... 210/772, 400, 401, 407, 210/216; 68/158, 44, 9; 162/60, 61, 55, 380, 57, 62, 70, 56

[56] References Cited

U.S. PATENT DOCUMENTS

| | | | |
|---|---|---|---|
| 4,154,644 | 5/1979 | Ericsson | 160/60 |
| 4,501,662 | 2/1985 | Biondetti | 210/401 |
| 4,543,155 | 9/1985 | Stawicki | 162/60 |
| 4,722,793 | 2/1988 | Seifert et al. | 210/401 |
| 4,735,684 | 4/1988 | Seejnow | 162/60 |
| 4,827,741 | 5/1989 | Luthi | 162/60 |
| 5,045,181 | 9/1991 | North | 210/401 |
| 5,122,229 | 6/1992 | Seifert | 162/60 |
| 5,133,832 | 7/1992 | Gilkey | 162/55 |

Primary Examiner—W. Gary Jones
Assistant Examiner—Brenda Lamb
Attorney, Agent, or Firm—Biebel & French

[57] ABSTRACT

A wire-type pulp washing machine includes an endless moving foraminous wire which extends about a breast roll defining an on-running end and a couch roll defining an off-running end with a generally horizontal upper run of the wire extending between the rolls with showers providing a counter-current washer. The endless wire forms a wire return run having a horizontal wire section beneath the upper run. Pulp which has been washed on the upper counter-current washer may be removed and subjected to a chemical action, such as a bleaching action, and then reapplied to a horizontal return run section of the wire by a headbox to form a pulp mat on the inside surface of the wire. This pulp mat is subject to further countercurrent washing by the application of wash water to an upper surface of the mat and by draining of the wash water through the wire by suction boxes. This wash water may advantageously be applied as the wash water to the last stage of the counter-current washer along the upper run. The pulp mat is then removed from the lower return run section.

6 Claims, 2 Drawing Sheets

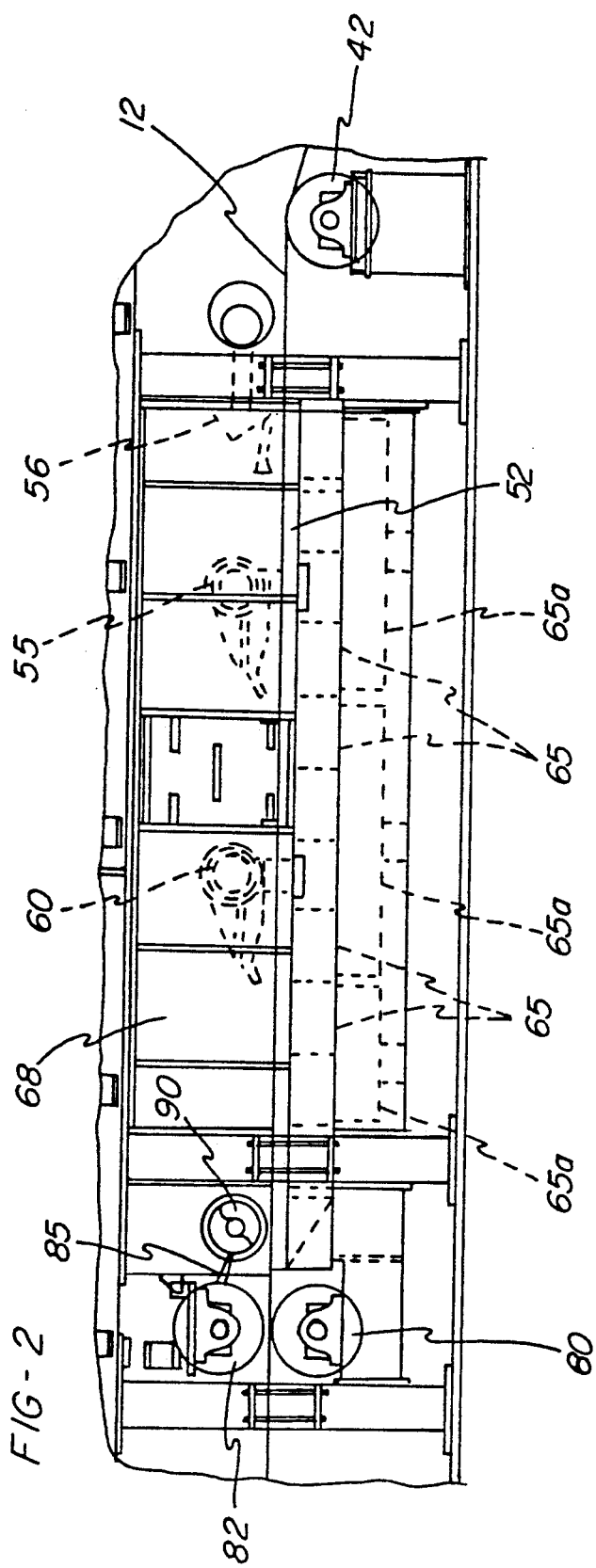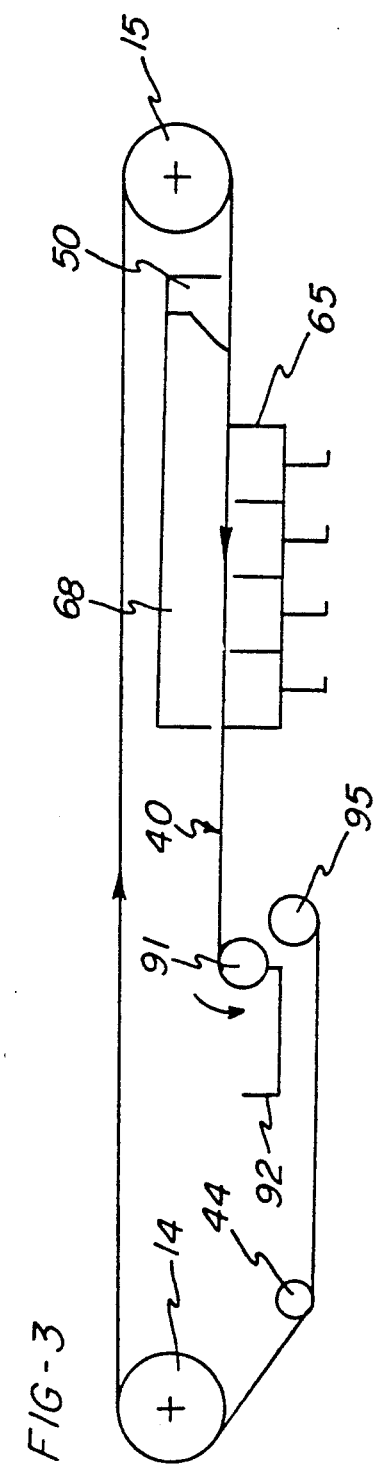

PAPER PULP WASHING

BACKGROUND OF THE INVENTION

In the preparation of pulp for use in the manufacture of paper, a common process includes the digesting of wood chips in pulping liquor to break down the pulp into individual fibers and bunches of fibers by dissolving the substances, such as lignins, which bind the fibers together. The spent pulping liquor will therefore contain such dissolved substances and spent chemicals.

The preparation of pulp from wood chips may require two or more separate pulp washing operations. For example, the ground wood or wood chips are first processed with chemicals under pressure and temperature, usually by either the kraft alkaline process or by the sulfite acid process. In either process, digestion dissolves the lignins thereby freeing the fibers and placing the lignin components into solution. In both processes the resulting liquor is dark in color, and the residual liquor which does not drain from the pulp and the remaining contaminants must be washed from the pulp. Further, it is desirable to recover spent liquor at as high a concentration as practical to minimize the cost of the subsequent recovery of chemicals.

Brown pulp which has been so washed retains a definite brown color and the pulp which remains is usually too highly colored for making white paper. Also, if any lignin is present, paper made from such pulp may not have a high degree of permanence and will yellow in time. Therefore, it is common and conventional to apply a bleaching process to the pulp, not only to improve whiteness, but to improve permanence of the whiteness.

The bleaching commonly is performed in a chlorination stage by applying a water in which chlorine gas has been dissolved. Other bleaching processes may be used, such as a sodium hydrosulphite process, as is well known in the art. Bleaching may not be accomplished in a single stage and may be performed in two or more stages, each followed by washing. After bleach treatments, the pulp is subjected to a washing action to remove the water which contains the spent bleaching agents and dissolved lignin.

A particularly effective and useful pulp washer is manufactured and sold by The Black Clawson Company, the assignee of this application, under the trade name CHEMI-WASHER, in accordance with the teachings of Ericsson, U.S. Pat. No. 4,154,644 issued May 15, 1979, the disclosure of which is incorporated herein by reference. The Ericsson apparatus is an efficient flat bed countercurrent washer. It has a construction similar to that of a Fourdrinier paper machine, in that it incorporates an endless foraminous belt or wire, and a headbox which delivers the pulp suspension and liquor to one end of the wire. The pulp is subjected to successive washing zones or stages as it is carried by the wire through the machine.

In the operation of the Ericsson washer, a suspension of the pulp is diluted to a sufficiently low inlet consistency, such as 1.5% to 3.0%, and is deposited at the upstream end of the wire run where a mat of fiber is formed in a forming stage as the liquid drains through the wire. After the mat is formed on the wire it is partially dewatered to a displacement consistency of about 10% to 12% in the forming zone.

The machine downstream from the headbox and the forming zone is divided into a series of washing zones or stages to which a washing liquid is applied from above for drainage through the mat. The freshest or cleanest washing liquid is applied to the zone nearest the off-running end of the wire and the liquid drained through the mat at that zone is collected from the suction boxes and delivered to the immediately preceding washing zone. This is repeated from zone to zone, so that the cleanest pulp is treated with the cleanest water, and the dirtiest pulp is treated with the dirtiest water.

The requirement for an oxygen treatment or a bleaching process followed by a further washing, frequently results in a duplication of washing equipment or the addition of washing apparatus dedicated to washing the bleached pulp. Typically, such separate washing equipment may be in the form of a decker. The duplication of pulp washing equipment not only requires a duplication of apparatus, but in many instances, a duplication of the use of washing water, energy and floor space.

SUMMARY OF THE INVENTION

The disadvantages of extra equipment, or additional floor space, for pulp washing is resolved by the method and apparatus of this invention. Fourdrinier-type machines, that is machines which have a generally horizontally extending wire in an upper run, also have a return run, in which the wire returns from an off-running roll, i.e., the couch roll, back to the breast roll. Historically, the return run of the wire has not been used for pulp production or processing as such. It has only been utilized for washing of the wire, for maintaining wire tension and tracking, and in some instances for providing a motive or drive force to the wire. The return run of such a forming wire is not known to have been utilized for any form of pulp processing on the wire.

In a conventional Fourdrinier paper making machine, the bottom or return run of the wire cannot be used to make paper since the newly formed paper would have to be removed from the wire laterally of the machine and would likely be destroyed. However, for pulp thickening or washing, the bottom or return run presents no such obstacles since the mat formed during the pulp thickening or washing process is, in any event, destroyed when the pulp is removed from the wire.

In the apparatus and method of this invention, the return run, or at least a portion of the return run, of a horizontal counter-flow type of washer, is employed for further washing and/or treating of paper stock, such as for concurrent washing of stock from the upper run of the wire, or for treatment of a different stock, including washing and/or thickening. In the preferred embodiment, the stock pulp is applied to the inside surface of the wire, in a generally horizontal section of the return run, such as by a headbox or the like, and a pulp mat is thus formed on the wire inside surface, moving in a direction opposite to that of the upper run.

The pulp mat may be treated by one or more shower stages and/or suction boxes, thereby forming a secondary countercurrent washer. The pulp is removed from the wire for delivery transversely of the direction of wire movement, such as by lifting the pulp on a pick-up roll and doctoring the pulp mat into a transversely oriented screw conveyor or similar apparatus, for removal. The invention, however, is not limited to the application of a pulp suspension to the inside surface of the wire, as it would be a simple matter to reverse the direction of movement of the wire, in a defined horizontal section, to permit application to the outside surface thereof. Further, while the preferred embodiment of the invention is described in terms of a secondary counter-current washer, it is understood that the invention is not limited to pulp washing per se, and the horizontal section of the return run of the wire may be used for pulp thickening or dewatering, for example.

Such apparatus and method of this invention has the unique advantage of utilizing an otherwise unused section of the wire, and utilizing otherwise unused apparatus. Pumps for the suction boxes and pressure for the water sprays may be supplied by the same pumping apparatus as used for the corresponding sprays and suction boxes of an Ericsson type washer, associated with the upper horizontal run. The washing fluids, in appropriate circumstances, may be used in common, or separate washing fluids may be applied, in accordance with the requirements of the pulp and contaminants being washed therefrom.

An essential feature of the invention employs the return run, or at least a portion of the return run of a horizontal wire machine by applying pulp or the like to a return run of a the wire or the like, for processing and/or washing. In a preferred embodiment, the invention has the particular and unique advantage of actually using both sides of the wire, and using both the upper run and the return run, in a Fourdrinier type of pulp treating apparatus. It also provides a means by which two separate washing processes may be accomplished on the same machine, and in the same floor space.

The invention provides apparatus by which the washing water may be more fully and completely utilized, such as by using the wash water from the washing of the pulp from an oxygenation or bleaching process as part or all of the fresh water for the brown stock washing process. Typically, brown stock is applied for washing on the upper run, as is now conventional, and bleached pulp would be washed on the lower run.

The available space below the upper horizontal run of an Ericsson type counter-current washer is limited by the necessity for providing space for the wire driving rolls, the wire tracking roll and necessary wire cleaning showers. Nevertheless sufficient space remains, in a typical installation, permitting room for two or three stages of the counter-current washing, together with the usual hoods above the wire and suction boxes below the wire. Such two or three-stage counter-current washers are sufficient for removing the residual chemicals after the pulp has been subjected to a bleaching process. The water or liquor from this process is similarly uniquely usable as the fresh water input at the shower nearest the off-running end of the Ericsson type washer.

It is accordingly an important object of this invention to provide a method and apparatus by which a lower return run of a generally horizontal wire type washer is used for a pulp washing or treatment stage.

A broader object of the invention is the provision of an apparatus and method by which an inner wire surface of a horizontal wire machine is utilized, along the return run thereof, for treating or washing pulp or the like.

A still further object of the invention is the provision of a pulp washer of the counter-current type in which both horizontal upper and lower runs of an endless wire are used simultaneously for pulp processing.

Another object of the invention is the provision of a counter-current type of washer located and positioned to utilize at least a portion of a return run of a conventional counter-current wire-type washer.

A still further object of the invention is the provision of a second counter-current type of washer, located within the frame and positioned immediately beneath a horizontal upper run of a foraminous wire, for washing pulp, and in which the spent liquor from the second counter-current washer is utilized by a first counter-current washer associated with the upper run of the wire.

These and other objects and advantages of the invention will be apparent from the following description, the accompanying drawings and the appended claims.

BRIEF DESCRIPTION OF ACCOMPANYING DRAWINGS

FIG. 2 is an enlarged portion of FIG. 1 to illustrate the application of a pulp washer to the lower run of the foraminous wire; and FIG. 3 diagrammatically illustrates an alternative arrangement for removing pulp from the return run of the wire.

DESCRIPTION OF PREFERRED EMBODIMENT

Figure 1:
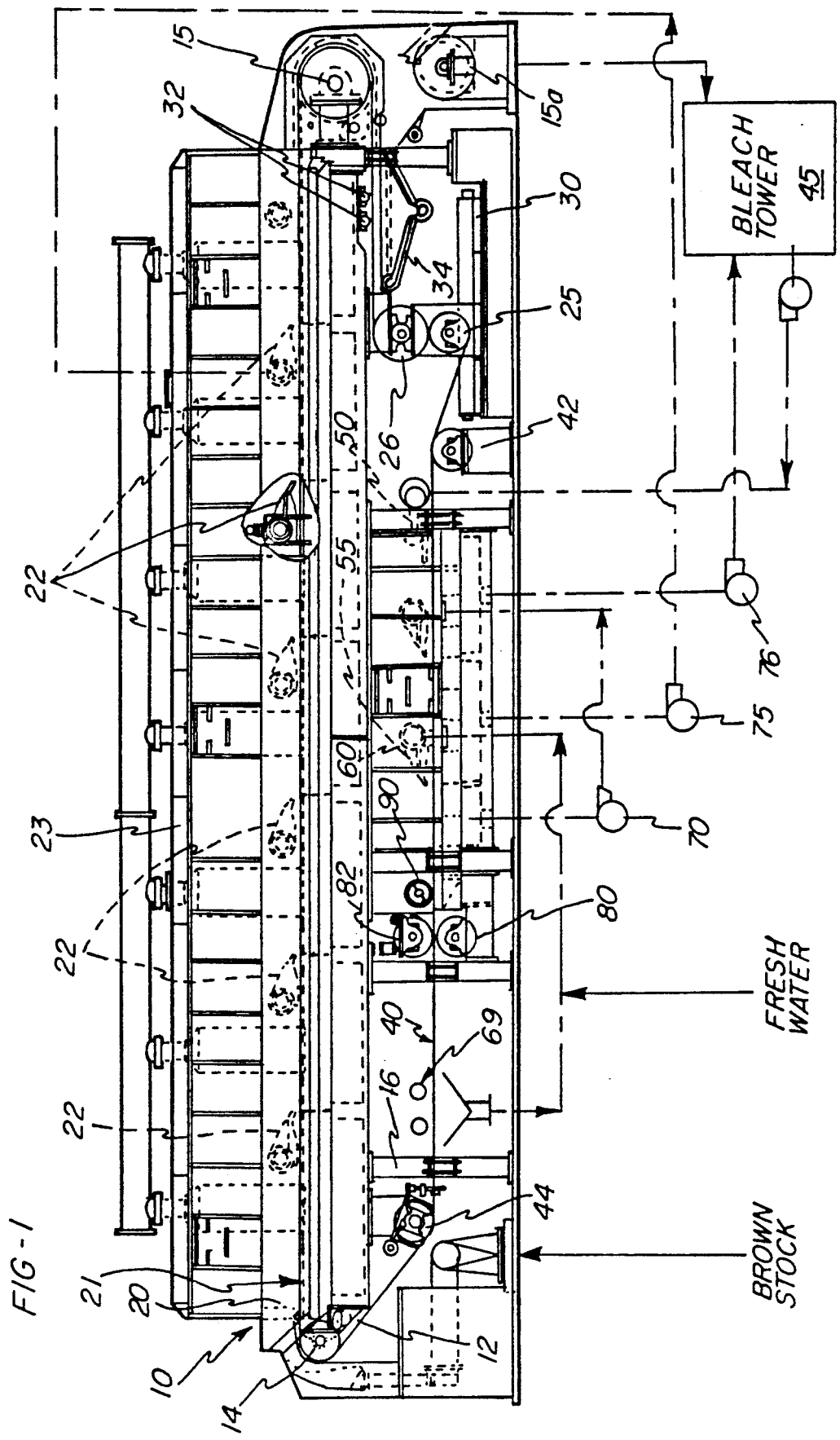
FIG. 1 illustrates a side view of a horizonal counter-current washer to which the invention has been applied along the lower run.

A counter-current washer as manufactured by the assignee of this invention and sold under the "Chemi-Washer" trademark and as described in the previously identified Ericsson patent is illustrated generally at 10 in FIG. 1. For a brief description of this washer, a driven foraminous belt or wire 12 in the form of a continuous loop is over a breast roll 14 at one end and an off-running roll or couch roll 15 at the other end. The wire 14 may be woven in endless fashion, or it may have adjacent ends which are joined by a pin seam to form an endless loop. When the term "endless" is used herein, it is intended to include wires which are formed without an end, and wires which have adjacent ends joined by a pin seam to make the wire continuous.

The rolls are mounted on a supporting frame 16. The upper run of the wire 12 between rolls is horizontal, with the breast roll 14 as the on-running end of the wire for the upper run, and the couch roll 15 defining the off-running end.

A headbox 20 applies a pulp stock to the upper or outer surface of the wire 12 at the on-running end where it is initially dewatered at a dewatering stage 21 on the wire, and forms a pulp mat on the outer surface of the wire 12. The mat is then subjected to countercurrent washing along a horizontal upper run in subsequent washing stages positioned along the wire between the headbox 20 and the off-running end of the wire at the couch roll 15. In the embodiment of FIG. 1, the washer 10 has a plurality of six washing stages represented by the showers 22 spaced along and above the wire, and corresponding suction box groups below the wire.

A counter-current flow of washing water is applied to the pulp mat by the showers, such as by the shower 22. A hood 23, common to all of the stages, encloses the headbox 20 and all of the showers.

The shower water which flows through the pulp mat on the wire is collected by the suction box means positioned below the upper run of the wire 12. The wash water collected at any stage is applied to the immediately preceding shower. In this manner, wash water is redirected onto the pulp mat in stages which are opposite in direction to the movement of the wire 12 along the upper run between the rolls 14 and 15. The result is that the cleanest water is applied to the pulp mat at the last washing stage immediately before it is discharged from the couch roll 15 into a receptacle or transverse screw conveyor 15a, while the dirtiest water as applied to the dirtiest brown pulp after the mat has been formed at the initial formation stage, immediately downstream of the headbox 20. To this extent, the machine of this invention operates according to the teachings of the Ericsson patent and further reference may be had to that document for a more complete understanding of the operation of a counter-current pulp washer.

The wire 12, as it leaves the couch roll 15 is brought over and under a pair of vertically stacked tension and drive rolls 25 and 26. This vertical roll stack is mounted on a screw adjustment base 30 adjacent the couch roll end of the wire and provides means of which the wire tension may be adjusted.

The use of such a pair of tension and drive rolls is conventional practice in the commercial design of a horizontal counterflow washer. Also, it is conventional practice to wash the wire 12, after it leaves the couch roll 15 by one or more showers 32 positioned above the wire at the beginning of the bottom run thereof. A trough-shaped catch pan 34 is positioned below the wire to catch the wash water. The showers direct cleaning water against the inner surface of the wire for the purpose of removing any pulp fibers which may not have been discharged from the outer surface of the wire at the couch roll 15 before such fibers could carried into the tension and drive rolls 25, 26.

A horizontal lower run section 40 of the wire 12 is formed within the machine frame. The lower run section is defined in part by a floor mounted guide roll 42 positioned on the off-running side of the roll 25, and the lower surface of a frame mounted wire guide roll 44 immediately ahead of the breast roll 14. This horizontal section 40 of the wire formed between the rolls 25 and 42 is utilized by the method and apparatus of this invention for pulp processing, such as for secondary washing after a bleaching or oxygenation in bleach apparatus or process illustrated diagrammatically at 45 in FIG. 1.

Diluted pulp from the process 45 is applied by a headbox 50 onto the inner surface of the wire 12 at an upstream end of the lower run 40, immediately downstream of the guide roll 42. This may be the same pulp which had been washed in the conventional upper portion of the washer and which has been subjected to the bleaching process, or it may be pulp from a separate or different supply, which has been chemically processed and requires washing or which requires thickening.

As in the case of the conventional counter-current washer, the pulp stock is applied by the headbox 50 to the wire 12 following dilution, at a consistency of from about 1½ to 3%. The pulp is therefore initially dewatered in a dewatering or formation stage 52, to form a mat of pulp fibers carried on the inner surface of the wire, having a consistency of about 10% to 12%.

Following the dewatering stage 52, the pulp mat is subjected to washing in a plurality of counter-current washing stages including a first stage represented by the shower 55 and a second stage represented by the shower 60. It will be understood that suction boxes 65 are positioned in side-by-side relation along the outer surface of the wire. The suction boxes 65 are joined or grouped together with common suction fox collectors 65a as in case of the suction boxes along the upper run of the wire. The suction boxes 65 are positioned side-by-side along the outer or outside surface of the wire 12 along the lower section run 40. The liquid from the showers is drained through the mat and through the wire by suction and by gravity, so that liquid flows from the inner wire surface of the outer wire surface. The head box 50 and the showers 55 and 60 are all enclosed by a common hood 68 (of lower profile than the hood 23) fitted between the wire section 40 and the suction and collection boxes of the upper run.

Liquid drained from the second washing stage is applied by a pump 70 to the first shower 55. Liquid to the second wash stage shower 60 may be applied from the wire washing showers including the first shower 32 and a secondary wire cleaning shower 69 and combined with fresh water make-up 72 as necessary. Water drained from the suction boxes associated with the first washing stage 55, the dirtiest water, is still relatively clean when considered in the context of brown pulp, and may be directed by a pump 75 to the final washing stage of the upper washer. Also, liquid derived from the forming stage 52 may be applied by a pump 76 back to the bleach process 45 for redilution of the pulp. The particular plumbing and counter-current use of the wash water in the washing stages of the present invention are illustrated as a preferred arrangement, but it would be obvious to a person skilled in the art that other flow arrangements may be used with success.

Following washing, the pulp mat is removed from the inside surface of the wire 12, in the horizontal section 14 and delivered transversely of the direction of movement of the wire, for further processing, or for use in the making of paper. A particularly effective arrangement for removing the mat includes a press in the form of a press roll 80 and a pick-off roll 82.

The press roll 80 may be grooved, and the pick-off roll 82 has a smooth surface. The pulp mat follows the smooth surface of the roll 82 after further liquid has been extracted by the press roll 80, and is doctored off of the roll 82 by a doctor 85 into the trough of a transversely oriented screw conveyor 90 for delivery transversely of the direction of wire movement. Thereafter, as the wire exits the press section, it is washed by the showers 69 and proceeds to the breast roll 14.

FIG. 3 diagrammatically illustrates an alternative arrangement for removing the pulp from the inside surface of the wire 12, at the lower run. Like parts have been designated with like reference numerals, for more ready comparison to FIG. 2. In FIG. 3, an intermediate couch roll 91 receives the off-running end of the wire, at the end of the horizontal section 40 and dumps the pulp into a conventional container trough or transverse conveyor 92. The direction of the wire is then reversed by a tension and wire reversing roll 95, from which the wire then may run directly to the roll 44. The arrangement diagrammatically illustrated in FIG. 3 may be preferred, where space permits, due to the positive arrangement for unloading the wire, essentially in the same manner as the pulp mat is unloaded from the wire at the couch roll 15.

It will be understood that the main power to the wire is applied through the couch roll 15 and the tension and drive rolls 25 and 26. By the proper tension, the wire 12 will be drawn through both the upper and lower runs under tension, and if any slack forms in the wire, it will form at the region of lowest tension between the off-running side of the pick-off roll 82 at the end of the counter-current washing section within the frame associated with the horizontal return run section 40, and the guide roll 44.

The operation of the invention is largely self-evident from the foregoing description. Pulp to be washed by this invention is applied from the upper horizontal run or from another source to a chemical treatment as illustrated generically by the box 45 to a headbox 50 located within the frame of the machine 10 beneath the upper run and immediately downstream from the guide roll 42. The headbox 50 applies the pulp at relatively low consistency along the wire 12 on its inside surface where, by initial drainage at a formation zone 52, a fiber mat is formed for concurrent washing along this section. The showers 55 and 60 may be identical to the showers 22 used in the upper portion of the washer 10. The difference, however, is the fact that the washers 55 and 60 are located above the horizontal run or section 40 of the wire, and between the wire and horizontal support structure for the washer. The hood 68 is positioned between the upper suction boxes for the upper run and the wire. The upper and lower hoods may be connected in common and ventilated, as described in the Ericsson patent. They are preferably pressurized from a common source of air pressure, and this common source may be the same as that used in connection with the washing apparatus on the upper run.

A unique aspect of this invention resides in the fact that the material carried on the wire is removed transversely of the direction of wire movement. The smooth pick-up roll 82 is operational since the speed is not sufficiently great so as to cause the fiber mat to be flung from the surface of the roll due to centrifugal force. Other arrangements may be used for lifting the fiber mat from the inside surface of the wire, including transversely oriented lifting wedges formed of high density polyethylene or transversely oriented blades or plows. A chest or container may be positioned adjacent a lateral edge of the wire for receiving the pulp which has been lifted and moved transversely of the direction of wire movement, although a transversely oriented screw-type conveyor is preferred due to its efficiency.

The overall washer apparatus according to this invention is believed to be unique in that the lower run of the wire is utilized. Also, both the outer and inner surfaces of a wire loop are used for drainage. An effective washer is provided by using a portion of the return run of the wire in such a manner that the overall length and size of the washer is not increased, and the added power requirements should not exceed that which would otherwise be incurred by the installation and operation of a separate independent washer. The secondary washing and/or thickening provided by this invention has the further advantage, in the case of paper pulp, of maximizing the use of a given quantity of water by counter-circulating the water from a bleach section to a brown pulp section, as previously described.

The concept of the invention, namely, the use of a return wire in a Fourdrinier-type of pulp processing apparatus is not intended to be limited to the application of pulp to the inside surface of the wire only, along the bottom run. A pair of rolls may be used for the purpose of reversing the direction of wire movement in the return run, so that the pulp could be placed on the outer surface of the wire in the portion in which the direction of wire movement is reversed. However, this would not be a preferred arrangement in view of the added complexity for wire handling and the space required.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. Apparatus for washing papermaking pulp comprising: a breast roll,
    a couch roll,
    a foraminous wire loop trained around said rolls and defining an upper wire run extending between and over said rolls and a lower return wire run positioned beneath said upper run having an upstream end at the off-running side of said couch roll and a downstream end at the on-running side of said breast roll,
    means for supplying pulp stock to be washed to the upper surface of said upper wire run adjacent said breast roll,
    means for applying wash water to pulp on said upper run,
    suction box means beneath said upper wire run for removing wash water therefrom,
    means for removing washed pulp from said wire at said couch roll,
    pulp bleaching apparatus,
    means connected to deliver said removed washed pulp to said bleaching apparatus,
    means connected to deliver bleached pulp from said bleaching apparatus to an upper surface of said wire at return wire run at said upstream end thereof to form a mat of bleached pulp on said return wire run,
    means for applying wash water to said bleached pulp mat on said return wire run,
    means for draining wash water from said bleached pulp mat to form a washed bleached pulp mat, and
    means for removing said washed bleached pulp mat from said return wire run at said downstream end thereof.

2. The apparatus of claim 1 in which said means for removing said bleached pulp mat comprises:
    a pick-up roll positioned for lifting said mat from said wire at said downstream end, and
    a transversely positioned screw conveyor between said wire runs for collecting pulp from said pick-up roll and delivering said pulp transversely of the direction of wire movement.

3. The apparatus of claim 1, further comprising means for applying said wash water collected from said wash water draining means to pulp on said upper wire run.

4. Apparatus for washing a suspension of paper making pulp in liquid, comprising:
    a frame including means for supporting an endless foraminous wire in a loop including a substantially horizontal upper run and a substantially horizontal lower return run,
    means for driving said wire in a single direction to define upstream and downstream ends of each of said runs,
    means for depositing the suspension on said upstream end of said upper wire run for drainage therethrough to form a pulp mat on said upper run and thereby establishing a formation zone, means including a plurality of drainage receptacles within said loop which define a corresponding plurality of successive washing zones between said formation zone and said downstream end of said upper wire run, means for delivering washing liquid to each of said washing zones from above for displacement washing of the portion of said mat passing therethrough and drainage into said receptacles, means for supplying fresh washing liquid to said delivering means for the one of said washing zones adjacent said downstream end of said upper wire run, means for conveying drained liquid from each of said receptacles counter-currently with respect to the direction of movement of said wire to said delivering means for the adjacent said washing zone upstream from said receptacle, means for removing the resulting washed mat from said downstream end of said wire upper run, headbox means within said wire loop for depositing a suspension of paper making pulp in liquid on the inner surface of said lower wire run adjacent said upstream end thereof, receptacle means below said upstream end of said lower wire run for receiving liquid draining therethrough and leaving a pulp mat on said lower wire run, means within said loop between said upstream and downstream ends of said lower wire run for delivering washing liquid onto said mat traveling downstream on said lower wire run, additional receptacle means below said lower wire run for receiving washing liquid draining therethrough, and means within said loop adjacent said downstream end of said lower wire run for removing the resulting washed pulp from said lower wire run and delivering said removed pulp out of said loop.

5. Apparatus as defined in claim 4 further comprising a pulp bleaching means, means connected to convey said pulp mat from said downstream end of said upper wire run to said bleaching means, and means connected to convey the resulting bleached pulp from said bleaching means to said headbox means within said wire loop.

6. Apparatus as defined in claim 5 further comprising means connected to deliver liquid from said receptacle means below said lower wire run to said liquid delivering means for the one of said washing zones on said upper wire run adjacent said downstream end thereof.

* * * * *